United States Patent
Nishimura

(10) Patent No.: US 10,724,868 B2
(45) Date of Patent: Jul. 28, 2020

(54) MANAGEMENT SYSTEMS, MANAGING METHODS, AND RECORDING MEDIUMS FOR COOPERATIVE TRANSFER OF SHARED ALONG TRANSFER PATHWAYS

(71) Applicant: Toyota Jidosha Kabushiki Kaisha, Toyota-shi, Aichi-ken (JP)

(72) Inventor: Kazuya Nishimura, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/283,050

(22) Filed: Feb. 22, 2019

(65) Prior Publication Data
US 2019/0265052 A1 Aug. 29, 2019

(30) Foreign Application Priority Data

Feb. 26, 2018 (JP) ................................ 2018-032298

(51) Int. Cl.
*G01C 21/34* (2006.01)
*H04W 4/029* (2018.01)
*G08G 1/00* (2006.01)

(52) U.S. Cl.
CPC ......... *G01C 21/3438* (2013.01); *G08G 1/205* (2013.01); *H04W 4/029* (2018.02)

(58) Field of Classification Search
CPC .... H04W 4/029; G01C 21/3438; G08G 1/205
See application file for complete search history.

(56) References Cited

U.S. PATENT DOCUMENTS

| 2009/0313095 | A1* | 12/2009 | Hurpin | G06Q 20/127 705/13 |
| 2012/0116825 | A1* | 5/2012 | Gallais | G06Q 10/02 705/5 |
| 2015/0348179 | A1* | 12/2015 | Kamisawa | G08G 1/205 705/5 |
| 2018/0089596 | A1* | 3/2018 | Hirose | G08G 1/00 |
| 2019/0072398 | A1* | 3/2019 | Balakrishna | G01C 21/3469 |

FOREIGN PATENT DOCUMENTS

JP 2012215921 A 11/2012

* cited by examiner

*Primary Examiner* — Hongmin Fan
(74) *Attorney, Agent, or Firm* — Dinsmore & Shohl LLP

(57) ABSTRACT

A management system includes a storing unit that stores route information on a running course of each of a plurality of users, a selecting unit that selects a user who is expected to cooperate in a task of transferring a vehicle, along a part or whole of a transfer pathway from a transfer start point of the vehicle to a transfer destination, from the users, based on a positional relationship between the transfer pathway, and the running course of each of the users, and a communicating unit that sends a message that proposes cooperation in the task of transferring the vehicle, along the part or whole of the transfer pathway, to a communication terminal of the user selected.

9 Claims, 3 Drawing Sheets

MANAGEMENT SYSTEMS, MANAGING METHODS, AND RECORDING MEDIUMS FOR COOPERATIVE TRANSFER OF SHARED ALONG TRANSFER PATHWAYS

CROSS-REFERENCE TO RELATED APPLICATION

This application claims priority to Japanese Patent Application No. 2018-032298 filed on Feb. 26, 2018, incorporated herein by reference in its entirety.

BACKGROUND

1. Technical Field

The present disclosure relates to a management system, managing method, and recording medium.

2. Description of Related Art

With the development of information and communication technologies and changes in lifestyles, or for economic reasons, times have been changing from the era in which individuals own or possess things, to the era in which people share things in communities. In the field of carsharing, for example, members share a car subjected to sharing (which will be called "shared car") with one another, and they can check the situation of use of the shared car and make reservations for use, via the Internet, or the like. Through the carsharing, each user can cut the cost for purchasing a vehicle, maintenance cost, cost of a parking place, and so forth, as compared with the case where the user owns the vehicle. Places where there is a high demand for carsharing tend to center around places, such as those around stations, having a high level of traffic convenience; therefore, load distribution or balancing among car stations presents a problem. For example, according to a technology proposed in Japanese Patent Application Publication No. 2012-215921 (JP 2012-215921 A), when a user wishes to use a car station having a high degree of congestion, a system disclosed in this publication provides the user with a suggestion of use of another car station which is located within walking distance of the user, or to which the user can go through the use of transportation, such as a train or a bus, in place of the car station having a high degree of congestion.

SUMMARY

However, in a carsharing service called one-way type carsharing, a location that is different from a start position of a shared car can be selected as a place of return of the shared car, which may result in a large number of shared cars returned to a particular car station, for example. In this case, some of the shared cars need to be transferred from a car station where there are an excessive number of shared cars, to a car station that is short of shared cars. In general, staff members of the car station concerned perform the car transferring task on their own, or ask professionals to perform the transferring task. It has been therefore desired to reduce the burden of transferring task.

The present disclosure provides a management system, a management method, and a recording medium that can achieve reduction of a burden associated with the task of transferring vehicles.

A management system according to a first aspect of the present disclosure includes a storing unit that stores route information on a running course of each of a plurality of users, a selecting unit that selects a user who is expected to cooperate in a task of transferring a vehicle, along a part or whole of a transfer pathway from a transfer start point of the vehicle to a transfer destination, from the plurality of users, based on a positional relationship between the transfer pathway, and the running, course of each of the users, and a communicating unit that sends a message that proposes cooperation in the task of transferring the vehicle, along the part or whole of the transfer pathway, to a communication terminal, of the user selected.

The management system according to the first aspect of the present disclosure is able to reduce the burden associated with the task of transferring vehicles.

A managing method of a managing system including a processor and a communication module according to a second aspect of the present disclosure includes: storing, by the processor, route information on a running course of each of a plurality of users; selecting, by the processor, a user who is expected to cooperate in a task of transferring a vehicle, along a part or whole of a transfer pathway from a transfer start point of the vehicle to a transfer destination, from the plurality of users, based on a positional relationship between the transfer pathway, and the running course of each of the users; and controlling, by the processor, the communication module so as to send a message that proposes cooperation in the task of transferring the vehicle, along the part or whole of the transfer pathway, to a communication terminal of the user selected.

The management system according to the second aspect of the present disclosure is able to reduce the burden associated with the task of transferring vehicles.

A non-transitory readable recording medium according to a third aspect of the present disclosure holds a program that makes a processor execute a management method of a managing system including a processor and a communication module. The program causes the managing system to perform the managing process including; storing route information on a running course of each of a plurality of users; selecting a user who is expected to cooperate in a task of transferring a vehicle, along a part or whole of a transfer pathway from a transfer start point of the vehicle to a transfer destination, from the plurality of users, based on, a positional relationship between the transfer pathway, and the running course of each of the users; and controlling the communication module so as to send a message that proposes cooperation in the task of transferring the vehicle, along the part or whole of the transfer pathway, to a communication terminal of the user selected.

The management system according to the above aspect of the present disclosure is able to reduce the burden associated with the task of transferring vehicles.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION

Figure 1:
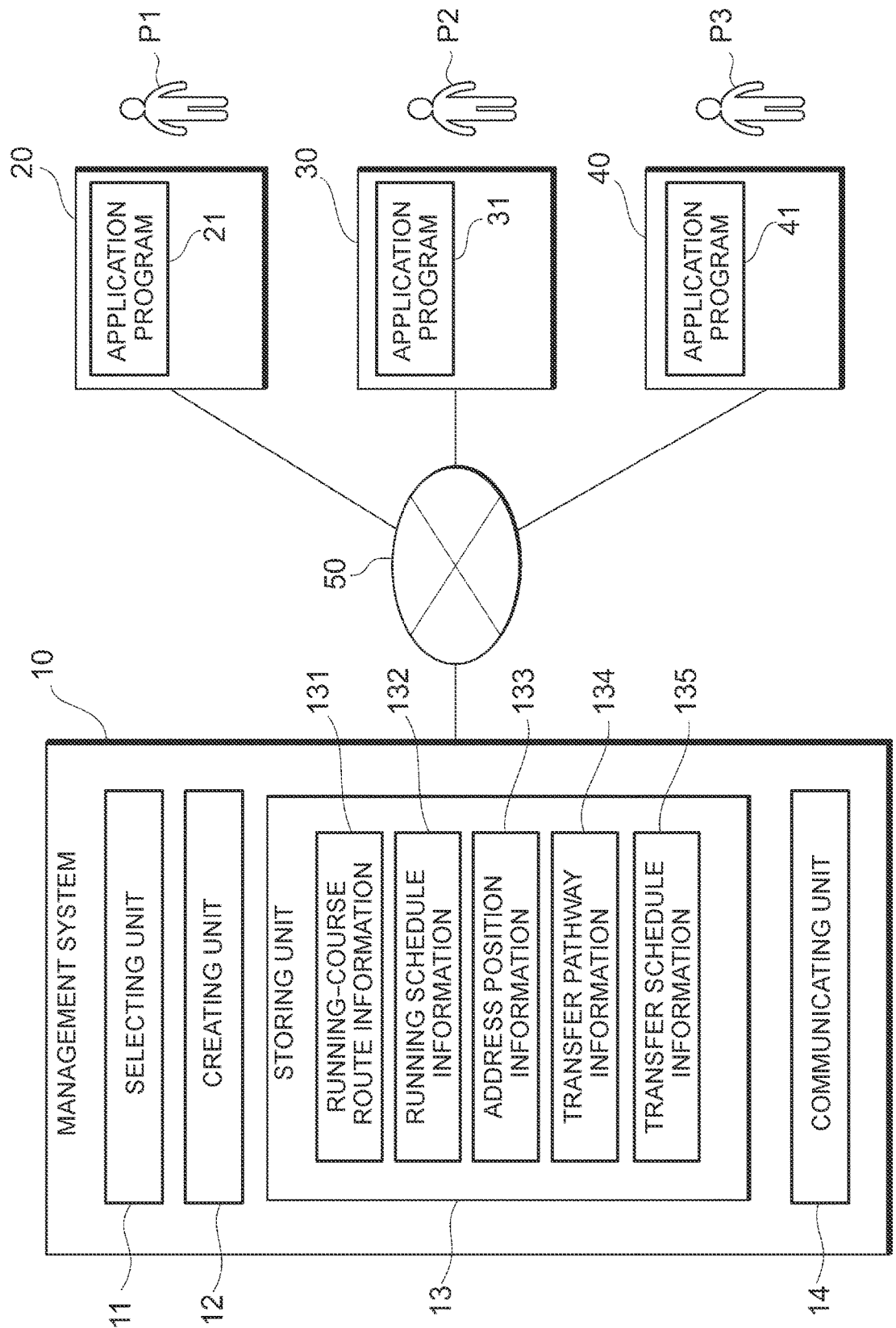
FIG. 1 is an explanatory view showing function blocks of a management system according to one embodiment of the present disclosure.

One embodiment of the present disclosure will be described with reference to the drawings. Here, the same reference numerals denote the same constituent elements, and these elements will not be repeatedly described. FIG. 1 shows function blocks of a management system 10 according to the embodiment of the present disclosure. The management system 10 is a computer system that performs management of shared cars (for example, allocation management of shared cars). The management system 10 performs allocation management of shared cars, by gaining cooperation from users as ordinary people who do running or jogging on a regular basis. The allocation management of shared cars includes management of the task of transferring shared cars, and users who cooperate in this task sign up in advance for a particular service with the intent of cooperating in the task of transferring shared cars, for example. The management system 10 may also function to accept reservations for shared cars, and manage lending and returning of cars, as well as allocation management of shared cars. As used herein, "shared cars" mean vehicles offered for use in sharing (e.g., shared use among members). As used herein, "vehicles" include vehicles (e.g., automobiles, motorbikes, and light road vehicles) defined under traffic laws.

The management system 10 includes a processor, storage device, communication module, and input-output interface, as its hardware resources. The storage device includes a storage resource that functions as a work area of the processor, a storage resource, that stores a management program for implementing a managing method concerned with allocation management of shared cars, and a storage resource that stores various kinds of information used for implementation of the management program. The various kinds of information include, for example, a running-course route information 131, running schedule information 132, address position information 133, transfer pathway information 134, transfer schedule information 135, and so forth. The above-indicated storage resources are storage areas provided by a computer readable recording medium (such as a volatile memory, non-volatile semiconductor memory, or disc medium). The processor interprets and executes the management program, thereby to perform functions as a selecting unit 11, creating unit 12, storing unit 13, and communicating unit 14. Each of these units is a function implemented through cooperation between the hardware resource of the management system 10 and the management program. For example, the functions (or processing) of the selecting unit 11 and creating unit 12 are implemented by the functions (or processing) of the processor. The function (or processing) of the storing unit 13 is implemented by the function (or processing) of the storage device. The function (or processing) of the communicating unit 14 is implemented by the function (or processing) of the communication module. The function of each of these units will be described later.

The communication terminals 20, 30, 40 are communication terminals of users P1, P2, P3, respectively, who sign up in advance for the above-mentioned particular service, and are installed with the GPS (Global Positioning System) function. The communication terminals 20, 30, 40 are respectively installed with application programs 21, 31, 41 for carrying out a process concerning offering of the particular service. For example, the communication terminals 20, 30, 40 are mobile communication terminals, such as multifunctional mobile phones called "smartphones", or tablet terminals, having a mobile communication function. The functions of the application programs 21, 31, 41 will be described later.

The management system 10 and the communication terminals 20, 30, 40 are connected via a communication network 50. The communication network 50 includes a wired network (e.g., a local area network (LAN), wide area network (WAN), or value-added network (VAN)), which is mixed with a wireless network (e.g, mobile communication network, satellite communication network, Bluetooth (registered trademark), Wireless Fidelity (WiFi), or High Speed Downlink Packet Access (HSDPA)).

The storing unit 13 stores the running-course route information 131, running schedule information 132, address position information 133, transfer pathway information 134, and transfer schedule information 135.

The running-course route information 131 includes route information on the running course of each of the users P1, P2, P3. Each of the application programs 21, 31, 41 sends GPS position information on time-varying GPS positions of the corresponding communication terminal 20, 30, 40 while the user P1, P2, P3 is running, and clock time information on points in time at which the GPS position information was obtained, to the management system 10, via the communication network 50. In this manner, the management system 10 can obtain route information on the running courses of the users P1, P2, P3, and the dates and times of running actually performed.

The running schedule information 132 includes information concerning the running schedule of each of the users P1, P2, P3. For example, when it can be presumed, from the information concerning the dates and times of running obtained by the management system 10, that a certain user does running on a regular basis, in a particular time period of day, on a particular day of week, the running schedule information 132 includes information indicating the particular day of week and the particular time period of day. When a plan of running at a particular date and time is registered, in a calendar schedule management application program installed in any of the communication terminals 20, 30, 40, the corresponding application program 21, 31, 41 may inform the management system 10 of the information indicating the particular date and time, as the running schedule information 132.

The address position information 133 includes position information on the address of each of the users P1, P2, P3. Position information on the whereabouts of the user may be used in place of the position information on the address.

The transfer pathway information 134 includes information concerning a transfer pathway of a shared car. For example, the information includes position information on a transfer start point, position information on a transfer destination, and information on the transfer pathway from the transfer start point to the transfer destination. The number of transfer pathway(s) from one transfer start point to one transfer destination is not necessarily one, but may be two or more. The transfer start point and the transfer destination are different car stations, for example.

The transfer schedule information 135 includes information concerning the schedule (e.g., the scheduled date and time of transfer) of carrying out the task of transferring a shared car. The manager of the management system 10 may enter the transfer pathway information 134 and transfer schedule information 135 into the management system 10, via the input-output interface of the management system 10. In another example, the management system 10 may receive GPS position information from each shared car, via wireless communications, to thus detect the number of shared cars in each car station, and automatically create the transfer pathway information 134 and the transfer schedule information 135, so as to reduce variations in the number of shared cars among car stations.

Figure 2:
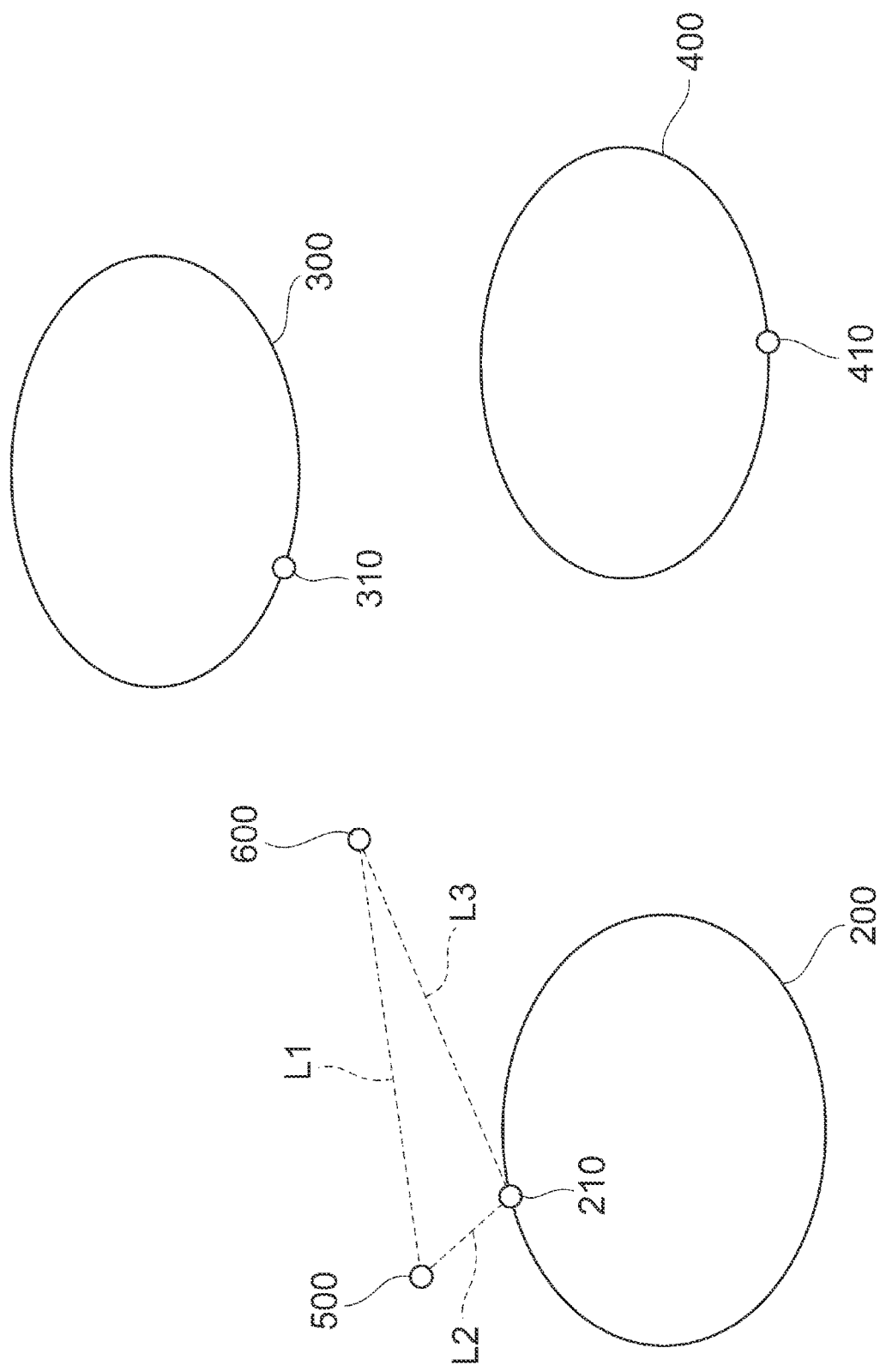
FIG. 2 is an explanatory view of a first managing method concerning allocation management of shared cars according to one embodiment of the present disclosure.

Referring next to FIG. 2, a first managing method concerning allocation management of shared cars according to one embodiment of the present disclosure will be described. In FIG. 2, reference numeral 500 denotes a transfer start point of a shared car, and reference numeral 600 denotes a transfer destination of the shared car. Reference symbol L1 denotes a transfer pathway from the transfer start point 500 to the transfer destination 600. Reference numerals 200, 300, 400 denote respective running courses of the users P1, P2, P3. Reference numerals 210, 310, 410 denote the positions of the addresses of the users P1, P2, P3, respectively. While the number of the users is three in the case shown in FIG. 2, for the purpose of illustration, the number of users may be two, or four or more.

The selecting unit 11 selects a candidate user who is expected to cooperate in the task of transferring the shared car, along a part or the whole of the transfer pathway L1, from the users P1, P2, P3, based on the positional relationship between the transfer pathway L1, and each of the running courses 200, 300, 400 of the users P1, P2, P3. For example, the selecting unit 11 may select a user who runs on a running course closest to the transfer pathway L1, out of the running courses 200, 300, 400, as the candidate user expected to cooperate in the task of transferring the shared car. Also, for example, the selecting unit 11 may rank the running courses 200, 300, 400, based on the distance from the transfer pathway L1, in the order from the one closest to the transfer pathway L1, and select a user or users running on a running course(s) within a predetermined rank order, as the candidate user(s) expected to cooperate in the task of transferring the shared car. When the addresses 210, 310, 410 of the users P1, P2, P3 lie on the running courses 200, 300, 400, respectively, the selecting unit 11 may select a user who runs on a running course that passes the address closest to the transfer pathway L1, as the candidate user expected to cooperate in the task of transferring the shared car.

The selecting unit 11 may select a candidate user who is expected to cooperate in the task of transferring a shared car, from the users P1, P2, P3, in view of a match or a degree of mismatch between the transfer schedule of the shared car, and the running schedule of each of the users P1, P2, P3. For example, the selecting unit 11 may select a user who runs according to a running schedule that fits with the transfer schedule of the shared car, or is different from the transfer schedule of the shared car within a range of a threshold value, as the candidate user expected to cooperate in the task of transferring the shared car. Also, for example, the selecting unit 11 may rank the running schedules of the users P1, P2, P3, in the order from the one having the smallest difference from the transfer schedule of the shared can and select one or more of the users running according to the running schedule(s) within a predetermined rank order, as the candidate user(s) expected to cooperate in the task of transferring the shared car.

The selecting unit 11 may also select a candidate user who is expected to cooperate in the task of transferring the shared car, from the users P1, P2, P3, in view of the relationship in magnitude between the sum (which will be called "user moving distance of running contingent to the transferring task") of a distance of a pathway L2 from the address of the user to the transfer start point 500, and a distance of a pathway L3 from the transfer destination 600 to the address of the user, and the distance of the running course of the user. For example, the selecting unit 11 may select a user who runs on a running course that is substantially equal in length to or longer than the user moving distance of running contingent to the transferring task, out of the running courses 200, 300, 400, as the candidate user expected to cooperate in the task of transferring the shared car. Also, with regard to a running course having a distance that is shorter than the user moving distance of running contingent to the transferring task, the selecting unit 11 may select a user who runs on the running course, as the candidate user expected to cooperate in the task of transferring the shared car, when a difference between the running course and the user moving distance of running contingent to the transferring task is within a range of a threshold value, or when the distance between the running course and the transfer pathway L1 is shorter than those of other running courses.

The selecting unit 11 may select a candidate user who is expected to cooperate in the task of transferring a shared car, from the users P1, P2, P3, in view of a match or a degree of mismatch between the transfer schedule of the shared car and the running schedule of each of the users P1, P2, P3, or further in view of the relationship in magnitude between the user moving distance of running, contingent to the transferring task, and the distance of the running course, in addition to the positional relationship between the transfer pathway L1 and the running course 200, 300, 400 of each of the users P1, P2, P3.

In the example shown in FIG. 2, it is assumed that the running course 200, out of the running courses 200, 300, 400, is located closest to the transfer pathway L1, and the running schedule of the user P1, out of the respective running schedules of the users P1, P2, P3, has the smallest difference from the transfer schedule of the shared car, while the distance of the running course 200 is equivalent to the user moving distance of running contingent to the transferring task (i.e., the sum of the distance of the pathway L2 from the address 210 of the user P1 to the transfer start point 500 and the distance of the pathway L3 from the transfer destination 600 to the address 210 of the user P1). In this case, the selecting unit 11 selects the user P1, as the candidate user expected to cooperate in the task of transferring the shared car. The creating unit 12 creates a message (e.g., an e-mail message or voice message) that proposes cooperation in the task of transferring the shared car, along a part or the whole of the transfer pathway L1. The communicating unit 14 sends the message that proposes cooperation in the task of transferring the shared car, to the communication terminal 20 of the selected user P1. This message may include guidance information about courtesy service (e.g., a discount of the fee for using carsharing, service, or giving of points having substantially the same economical value as the discount) in connection with car-sharing, which service is offered under a condition that the user agrees to the proposal of cooperation in the shared car transferring task.

In response to the message from the management system 10, the user P1 can send a notice as to whether he/she agrees to cooperation in the task of transferring the shared car, from the communication terminal 20 to the management system 10 via the communication network 50. When the user P1 agrees to cooperation in the task of transferring the shared car, the user P1 travels on foot or by running to the transfer start point 500, along the pathway L2 from the address 210, and gets in the shared car and drives it from the transfer start point 500. Once the user P1 passes through the transfer pathway L1 from the transfer start point 500, and arrives at the transfer destination 600, the user P1 gets off the shared car, and travels on foot or by running to the address 210 along the pathway L3.

When the user P1 transfers the shared car to a given point (e.g., the transfer destination 600), in response to the message from the management system 10, the creating unit 12 creates a message (e.g., an e-mail message or voice message) that suggests a running course that passes the vicinity of the given point. The communicating unit 14 sends the message suggesting the running course, to the communication terminal 20. Since the running course suggested by this message passes the vicinity of the point to which the user P1 transferred the shared car in the past, it becomes easier to gain the user's cooperation in the task of transferring a shared car along the transfer pathway L1, by having the user P1 run on this running course on a regular basis. The distance of the running course suggested by the message is desirably equivalent to the distance of the running course 200, and a part of the running course suggested by the message may overlap the running course 200.

Figure 3:
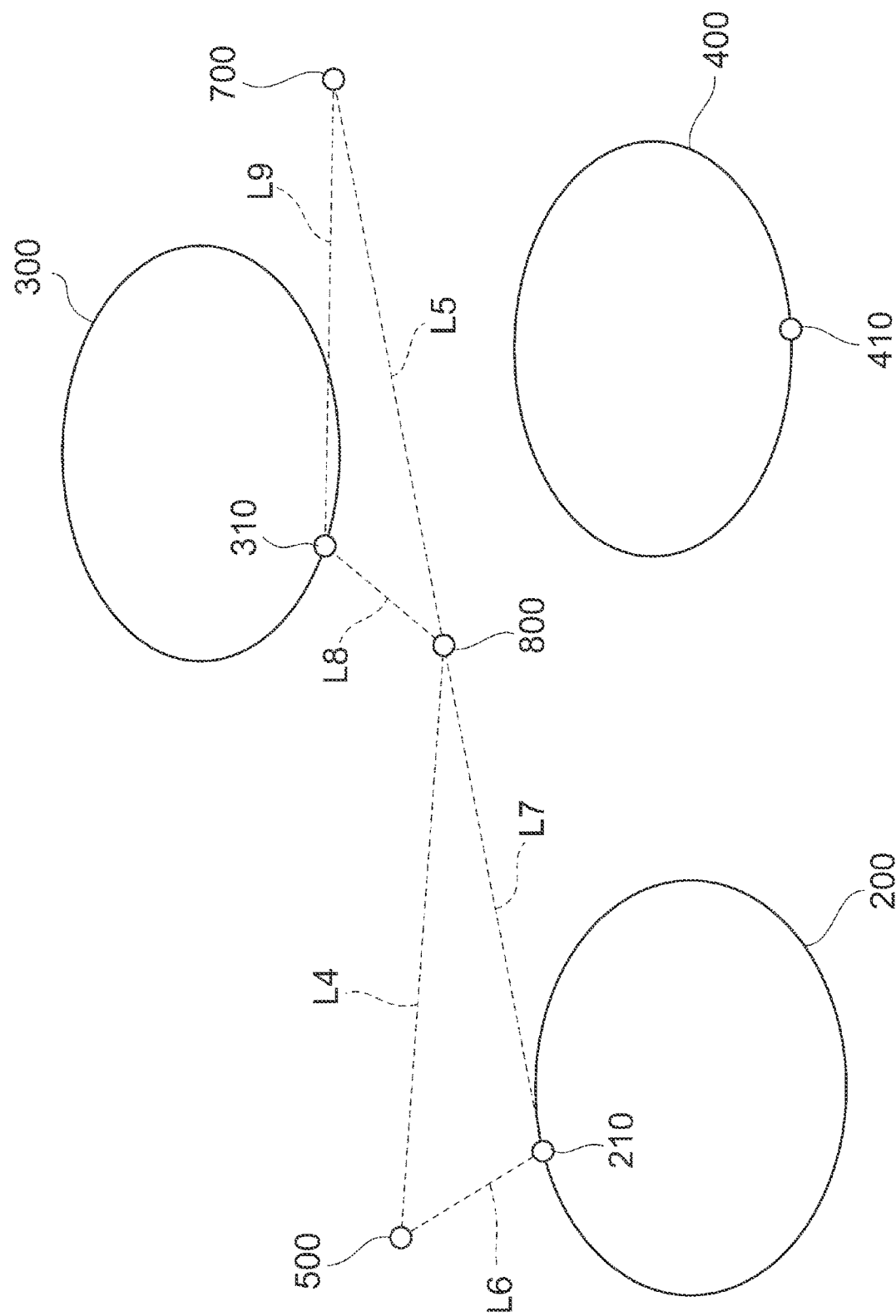
FIG. 3 is an explanatory view of a second managing method concerning, allocation management of shared cars according to one embodiment of the present disclosure.

Referring next to FIG. 3, a second managing method concerning allocation management of shared cars according to one embodiment of the present disclosure will be described. When a shared car is transferred from the transfer start point 500 to a transfer destination 700, and the user moving distance of running contingent to the transferring task is longer than the distance of the running course, the shared car is transferred by gaining cooperation of two or more users who are expected to cooperate in the task of transferring the shared car, such that the shared car is successively passed over from the transfer start point 500 to the transfer destination 700. Reference numeral 800 denotes a relay point at which the shared car is passed over between two users. The relay point 800 may be a car station, or a parking place, for example.

The selecting unit 11 selects the user P1, as a user who is expected to cooperate in the task of transferring the shared car, along a pathway L4 from the transfer start point 500 to the relay point 800, and selects the user P2, as a user who is expected to cooperate in the task of transferring the shared car, along a pathway L5 from the relay point 800 to the transfer destination 700, based on a method similar to the first managing method concerning allocation management of shared cars. Here, it is assumed that the distance of the running course 200 is equivalent to the user (user P1) moving distance of running contingent to the transferring task (namely, the sum of the distance of the pathway L6 from the address 210 of the user P1 to the transfer start point 500, and the distance of the pathway L7 from the relay point 800 to the address 210 of the user P1). Similarly, it is assumed that the distance of the running course 300 is equivalent to the user (user P2) moving distance of running contingent to the transferring task (namely, the sum of the distance of the pathway L8 from the address 310 of the user P2 to the relay point 800, and the distance of the pathway L9 from the transfer destination 700 to the address 310 of the user P2).

The creating unit 12 creates a message (e.g., an e-mail message or a voice message) that proposes cooperation in the task of transferring the shared car from the transfer start point 500 to the transfer destination 700 while successively passing over the shared car, and the message is then transmitted to the respective communication terminals 20, 30 of the selected users P1, P2. This message may include position information of the relay point 800, and information, such as the date and time when the shared car is passed over at the relay point 800. The message may also include guidance information on courtesy service, in connection with carsharing which service is offered under a condition that the user agrees to the proposal of cooperation in the shared car transferring task. The communicating unit 14 sends the message that proposes cooperation in the task of transferring the shared car while successively passing over the shared car, to the communication terminals 20, 30.

In response to the message from the management system 10, each of the users P1, P2 can send a notice as to whether he/she agrees to cooperation in the task of transferring the shared car, from the corresponding communication terminal 20, 30 to the management system 10 via the communication network 50. When the users agree to cooperation in the task of transferring the shared car, the user P1 travels on foot or by running from the address 210 to the transfer start point 500 along the pathway L6, and gets in the shared car at the transfer start point 500 and drives it from there. The user P2 travels on foot or by running from the address 310 to the relay point 800 along the pathway L8. When the user P1 passes through the transfer pathway L4 from the transfer start point 500, and arrives at the relay point 800, the user P1 gets off the shared car, and passes the shared car over to the user P2. Here, the user P1 travels on foot or by running to the address 210 along the pathway L7. The user P2 gets in the shared car at the relay point 800, and drives the car from there. When the user P2 passes through the transfer pathway L5, and arrives at the transfer destination 700, the user P2 gets off the shared car. The user P2 then travels on foot or running to the address 310 along the pathway L9.

When the user P1 transferred the shared car to a given point (e.g., the relay point 800), in response to the message from the management system 10, the creating unit 12 creates a message (e.g., an e-mail message or a voice message) that suggests a running course that passes the vicinity of the given point. The communicating unit 14 sends the message suggesting the running course, to the communication terminal 20.

When the user P2 transferred the shared car to a given point (e.g., the transfer destination 700), in response to the message from the management system 10, the creating unit 12 creates a message (e.g., an e-mail message or a voice message) that suggests a running course that passes the vicinity of the given point. The communicating unit 14 sends the message suggesting the running course, to the communication terminal 30.

The number of users expected to cooperate in the task of transferring the shared car from the transfer start point 500 to the transfer destination 700 while successively passing over the car may be three or more. In this case, the number of the relay points 800 will be two or more.

When the management system 10 sends a message that proposes cooperation in the task of transferring a shared car, to a user expected to cooperate in the task of transferring the shared car, but there is no response within a predetermined period of time, or the management system 10 receives a notice to the effect that the user does not agree to cooperation in the task of transferring the shared car, the management system 10 may send a message that proposes similar cooperation to another user expected to cooperate in the task of transferring the shared car, or may ask a professional to transfer the shared car. Also, the management system 10 may receive GPS position information via wireless communications from each shared car, and check if the user does not make a side trip during the task of transferring the shared car.

According to this embodiment, it is possible to transfer shared cars, by gaining cooperation of users who do running or jogging on a regular basis; therefore, the burden of the task of transferring shared cars can be reduced. Further, the cost required for the transferring task ran, also be reduced. While shared cars are illustrated by way of example, as vehicles to be transferred, in the above description, the present disclosure may also be applied to the task of transferring rental cars.

Each of the above embodiments is provided for making it easier to understand the present disclosure, but is not intended to be used for interpreting the present disclosure in a limited fashion. The present disclosure may be embodied with changes or improvements, without departing from its principle, and a gist of the present disclosure includes its equivalents. For example, the management program may include two or more software modules called for and executed during execution of a main program. The software modules are sub-programs in the form of modules for performing operation to implement the functions of the selecting unit 11, creating unit 12, storing unit 13, and communicating unit 14. Functions similar to the functions of the above-indicated units may also be implemented by using a dedicated hardware resource (e.g., an application specific integrated circuit (ASIC), or field programmable gate array (FPGA)) or firmware. It is also possible to encode the management program in a given signal form, and transmit it from a certain computer system to another computer system, via a transmission medium (a wire communication network) or transmission waves (radio waves). Also, the function of the management system 10 is not necessarily implemented by a single computer system, but may be implemented by two or more computer systems connected to the communication network 50.

What is claimed is:

1. A management system comprising:
   a storing unit that stores route information on a running course of each of a plurality of users;
   a selecting unit that selects a user who is expected to cooperate in a task of transferring a vehicle, along a part or whole of a transfer pathway from a transfer start point of the vehicle to a transfer destination, from the plurality of users, based on a positional relationship between the transfer pathway, and the running course of each of the users; and
   a communicating unit that sends a message that proposes cooperation in the task of transferring the vehicle, along the part or whole of the transfer pathway, to a communication terminal of the user selected.

2. The management system according to claim 1, wherein:
   the storing unit stores information on a running schedule of each of the users; and
   the selecting unit selects the user who is expected to cooperate in the task of transferring the vehicle, from the plurality of users, in view of a match or a degree of a mismatch between a transfer schedule of the vehicle, and the running schedule of each of the users.

3. The management system according to claim 1, wherein:
   the storing unit stores position information of an address of each of the users; and
   the selecting unit selects the user who is expected to cooperate in the task of transferring the vehicle, from the plurality of users, in view of a relationship in magnitude between a sum of a distance of a pathway from the address to the transfer start point, and a distance of a pathway from the transfer destination to the address, and a distance of the running course.

4. The management system according to claim 3, wherein:
   the selecting unit selects two or more users who are expected to cooperate in the task of transferring the vehicle while successively passing over the vehicle from the transfer start point to the transfer destination, from the plurality of users, when the sum of the distance of the pathway from the address to the transfer start point, and the distance of the pathway from the transfer destination to the address is longer than the distance of the running course; and
   the communicating unit sends a message that proposes cooperation in the task of transferring the vehicle while successively passing over the vehicle from the transfer start point to the transfer destination, to a communication terminal of each of the two or more users selected.

5. The management system according to claim 1, wherein in a case where the user selected transferred the vehicle to a given point, in response to the message that proposes cooperation in the task of transferring the vehicle, the communicating unit sends another message that suggests a running course that passes a vicinity of the given point, to a communication terminal of the user who transferred the vehicle.

6. The management system according to claim 1, wherein the vehicle is a shared car, and the transfer start point is a first car station, while the transfer destination is a second car station that is different from the first car station.

7. The management system according to claim 6, wherein the message includes guidance information on courtesy service in connection with carsharing, the courtesy service being offered under a condition that the user agrees to a proposal of cooperation in the task of transferring the shared car.

8. A managing method of a managing system including a processor and a communication module, the managing method comprising:
   storing, by the processor, route information on a running course of each of a plurality of users;
   selecting, by the processor, a user who is expected to cooperate in a task of transferring a vehicle, along a part or whole of a transfer pathway from a transfer start point of the vehicle to a transfer destination, from the plurality of users, based on a positional relationship between the transfer pathway, and the running course of each of the users; and
   controlling, by the processor, the communication module so as to send a message that proposes cooperation in the task of transferring the vehicle, along the part or whole of the transfer pathway, to a communication terminal of the user selected.

9. A non-transitory readable recording medium holding a program that makes a processor execute a management method of a managing system including a processor and a communication module, the program causing the managing system to perform the managing process, the managing process comprising:
   storing route information on a running course of each of a plurality of users;
   selecting a user who is expected to cooperate in a task of transferring a vehicle, along a part or whole of a transfer pathway from a transfer start point of the vehicle to a transfer destination, from the plurality of users, based on a positional relationship between the transfer pathway, and the running course of each of the users; and
   controlling the communication module so as to send a message that proposes cooperation in the task of transferring the vehicle, along the part or whole of the transfer pathway, to a communication terminal of the user selected.

* * * * *

UNITED STATES PATENT AND TRADEMARK OFFICE
CERTIFICATE OF CORRECTION

PATENT NO. : 10,724,868 B2
APPLICATION NO. : 16/283050
DATED : July 28, 2020
INVENTOR(S) : Kazuya Nishimura It is certified that error appears in the above-identified patent and that said Letters Patent is hereby corrected as shown below:

On the Title Page

Item (54), delete "MANAGEMENT SYSTEMS, MANAGING METHODS, AND RECORDING MEDIUMS FOR COOPERATIVE TRANSFER OF SHARED ALONG TRANSFER PATHWAYS" and insert --MANAGEMENT SYSTEMS, MANAGING METHODS, AND RECORDING MEDIUMS FOR COOPERATIVE TRANSFER OF SHARED VEHICLES ALONG TRANSFER PATHWAYS--, therefor.

Item (72), Inventor 1, city, delete "Okazaki" and insert --Okazaki-shi Aichi-Ken--, therefor.

In the Specification

In Column 1, Line(s) 1 - 4, title, delete "MANAGEMENT SYSTEMS, MANAGING METHODS, AND RECORDING MEDIUMS FOR COOPERATIVE TRANSFER OF SHARED ALONG TRANSFER PATHWAYS" and insert --MANAGEMENT SYSTEMS, MANAGING METHODS, AND RECORDING MEDIUMS FOR COOPERATIVE TRANSFER OF SHARED VEHICLES ALONG TRANSFER PATHWAYS--, therefor.

In Column 2, Line(s) 7, after "running", delete ",".

In Column 2, Line(s) 11, after "terminal", delete ",".

In Column 2, Line(s) 44, after "based on", delete ",".

In Column 3, Line(s) 2, after "concerning", delete ",".

In Column 3, Line(s) 34, after "resource", delete ",".

In Column 5, Line(s) 51, after "according", delete ",".

Signed and Sealed this
Eighth Day of December, 2020

Andrei Iancu
*Director of the United States Patent and Trademark Office*

CERTIFICATE OF CORRECTION (continued)
U.S. Pat. No. 10,724,868 B2

In Column 5, Line(s) 58, after "shared", delete "can" and insert --car,--, therefor.

In Column 6, Line(s) 27, after "running", delete ",".

In Column 6, Line(s) 54, after "carsharing", delete ",".

In Column 8, Line(s) 3, after "service", delete ",".

In Column 8, Line(s) 4, after "carsharing", insert --,--.

In Column 8, Line(s) 30 & 31, after "or", insert --by--.

In Column 9, Line(s) 5, after "task", delete "ran," and insert --can--, therefor.